United States Patent
Decker et al.

(10) Patent No.: US 10,926,774 B2
(45) Date of Patent: Feb. 23, 2021

(54) METHOD AND DEVICE FOR EVALUATING AND/OR INFLUENCING THE DRIVING BEHAVIOR OF A DRIVER OF A MOTOR VEHICLE

(71) Applicant: INIT INNOVATIVE INFORMATIKANWENDUNGEN IN TRANSPORT-, VERKEHRS- UND LEITSYSTEMEN GMBH, Karlsruhe (DE)

(72) Inventors: Christian Decker, Karlsruhe (DE); Simon Anderer, Waldbronn (DE)

(73) Assignee: INIT INNOVATIVE INFORMATIKANWENDUNGEN IN TRANSPORT-, VERKEHRS- UND LEITSYSTEMEN GMBH, Karlsruhe (DE)

( * ) Notice: Subject to any disclaimer, the term of this patent is extended or adjusted under 35 U.S.C. 154(b) by 0 days.

(21) Appl. No.: 15/739,039

(22) PCT Filed: Jun. 15, 2016

(86) PCT No.: PCT/DE2016/200276
§ 371 (c)(1),
(2) Date: Dec. 21, 2017

(87) PCT Pub. No.: WO2016/206680
PCT Pub. Date: Dec. 29, 2016

(65) Prior Publication Data
US 2018/0186380 A1    Jul. 5, 2018

(30) Foreign Application Priority Data
Jun. 26, 2015 (DE) ............... 10 2015 211 985.8

(51) Int. Cl.
*B60W 40/09* (2012.01)
*G07C 5/08* (2006.01)
(Continued)

(52) U.S. Cl.
CPC ............ *B60W 40/09* (2013.01); *B60W 50/14* (2013.01); *G07C 5/0808* (2013.01);
(Continued)

(58) Field of Classification Search
CPC ..... B60W 40/09; B60W 50/14; G07C 5/0808; G07C 5/0816; G07C 5/0824
(Continued)

(56) References Cited

U.S. PATENT DOCUMENTS

2008/0306636 A1* 12/2008 Caspe-Detzer ....... F02B 77/084
701/1
2011/0148614 A1* 6/2011 Wagner ................. B60W 40/09
340/439
(Continued)

FOREIGN PATENT DOCUMENTS

DE      10001261        7/2001
DE   102004002495    *  1/2004
(Continued)

*Primary Examiner* — Omar Casillashernandez
(74) *Attorney, Agent, or Firm* — Jason P. Mueller; FisherBroyles, LLP (57) ABSTRACT

A method for evaluating and/or influencing the driving behavior of a driver of a motor vehicle, involving a motor vehicle, in particular in local public transport or in inner-city traffic, preferably for use in vehicle fleets, is designed in such a manner that at least one parameter which describes the driving mode is determined, wherein the position of the gas pedal over time is determined as parameter, and wherein the state of the driving behavior, based on the determined position of the gas pedal, is visually displayed to the vehicle (Continued)

driver by means of a display system in the motor vehicle. Also disclosed is a corresponding device.

18 Claims, 9 Drawing Sheets

(51) Int. Cl.
    *B60W 50/14*     (2020.01)
    *B60W 50/00*     (2006.01)

(52) U.S. Cl.
    CPC ......... *G07C 5/0816* (2013.01); *G07C 5/0825* (2013.01); *B60W 2050/0016* (2013.01); *B60W 2050/146* (2013.01); *B60W 2540/10* (2013.01)

(58) Field of Classification Search
    USPC ........................................................ 340/439
    See application file for complete search history.

(56) References Cited

U.S. PATENT DOCUMENTS

| | | | |
|---|---|---|---|
| 2012/0078496 A1* | 3/2012 | Lindhuber | B60K 35/00 |
| | | | 701/123 |
| 2014/0032062 A1* | 1/2014 | Baer | G07C 5/08 |
| | | | 701/51 |
| 2014/0114502 A1* | 4/2014 | Hugron | B60W 50/14 |
| | | | 701/2 |
| 2014/0229043 A1* | 8/2014 | Frank | B60W 20/20 |
| | | | 701/22 |
| 2014/0340211 A1* | 11/2014 | Hennessey | B60W 50/14 |
| | | | 340/439 |
| 2015/0191178 A1* | 7/2015 | Roy | B60W 40/09 |
| | | | 701/36 |
| 2015/0294547 A1* | 10/2015 | Ito | B60K 28/06 |
| | | | 340/576 |
| 2018/0120839 A1* | 5/2018 | Hasberg | B60W 50/029 |

FOREIGN PATENT DOCUMENTS

| | | |
|---|---|---|
| DE | 10354322 | 6/2005 |
| DE | 102004002495 | 8/2005 |
| DE | 102008042342 | 4/2010 |
| DE | 102008055656 | 5/2010 |
| DE | 102008056343 | 5/2010 |
| DE | 102012004432 | 3/2013 |
| DE | 102014201965 | 8/2014 |
| DE | 102014215348 | 2/2015 |
| EP | 2442281 | 4/2012 |

* cited by examiner

METHOD AND DEVICE FOR EVALUATING AND/OR INFLUENCING THE DRIVING BEHAVIOR OF A DRIVER OF A MOTOR VEHICLE

The invention relates to a method for evaluating and/or influencing the driving behavior of a driver of a motor vehicle, involving a motor vehicle, in particular in local public transport or in inner-city traffic, preferably for use in vehicle fleets.

The invention further relates to a device for evaluating and/or influencing the driving behavior of a driver of a motor vehicle, in particular in local public transport or in inner-city traffic, preferably for use in vehicle fleets.

Methods for determining the driving behavior of a vehicle driver have been known in practice for years. Here, in the simplest case, they involve a tachograph, for example. Said tachograph records driving times and rest times, driving time interruptions, additional kilometers driven, and the driven speed of the vehicle. The data recorded by the tachograph reflects the driving behavior of the vehicle driver and is used, in particular, for controlling the compliance with driving times and rest times.

Moreover, DE 100 01 261 A1 discloses a method for evaluating the driving mode. For the determination of the driving behavior, for this purpose, the current driving state is continuously determined by means of a driving state determination unit. As relevant parameters, the vehicle speed, the positive or negative vehicle acceleration, the longitudinal distance to a vehicle driving ahead as well as any turning on of a blinker are acquired. The driving behavior acquired based on these parameters is compared with an optimal driving behavior, so that improvement suggestions can be displayed to the vehicle driver regarding his/her driving behavior.

Corresponding systems are used, for example, in vehicle fleets of transport companies, in order to increase the driving safety, save fuel and reduce carbon dioxide emission, and to keep vehicle wear as low as possible.

In the systems disclosed in the prior art, it is problematic that said systems are exceedingly cost intensive due to the elaborate sensor system. Another substantial disadvantage consists in that these systems are not suitable for determining the driving behavior of a vehicle driver who is active in local public transport or in inner-city traffic. Trips in local public transport are sometimes characterized by very short interval trips, namely trips between two stops. Due to the traffic situation in urban areas, which involves, for example, pedestrians or rapid weaving in and out in continuous traffic flow, acceleration processes and braking processes occur repeatedly in short intervals in such an interval trip. The parameters disclosed in the prior art for determining or evaluating the driving behavior are not suitable for such a traffic situation.

Therefore, the underlying aim of the present invention is to design and develop a method for evaluating and/or influencing the driving behavior of a vehicle driver, involving a motor vehicle, in such a manner that, using simple constructive means, a determination and optionally an influencing of the driving behavior during a trip is possible, particularly with regard to the fuel consumption. In addition, a corresponding device is to be disclosed.

According to the invention, the above aim is achieved by the features of Claim 1. Accordingly, a method for evaluating and/or influencing the driving behavior of a driver of a motor vehicle, involving a motor vehicle, in particular in local public transport or in inner-city traffic, preferably for use in vehicle fleets, is disclosed, wherein at least one parameter describing the driving mode is determined, wherein, as parameter, the position of the gas pedal over time is determined, and wherein the state of the driving behavior, based on the determined position of the gas pedal, is visually displayed to the vehicle driver by means of a display system in the motor vehicle.

With regard to the inventive device, the above aim is achieved by the features of Claim 10. Accordingly, a device for evaluating and/or influencing the driving behavior of a driver of a motor vehicle, in particular in local public transport or in inner-city traffic, preferably for use in vehicle fleets, is disclosed, wherein the device comprises a detection device for determining at least one of the parameters describing the driving behavior, a computing unit, and a display device, wherein the detection device is configured in such a manner that, as parameter, the position of the gas pedal over time can be determined, wherein the computing unit is configured in such a manner that, based on the determined position of the gas pedal, the state of the driving behavior can be determined, and wherein the display device is configured in such a manner that the state of the driving behavior can be visually displayed.

In an inventive manner, it has been recognized that the underlying aim can be achieved in an ingeniously simple manner by the acquisition of the position of the gas pedal, since this parameter, which has not been taken into consideration so far, reflects or represents the driving behavior of the vehicle driver, in particular with a view to the fuel consumption. Moreover, it has been recognized that this parameter, precisely in the case of very short interval trips, as they occur in local public transport or in inner-city traffic, describes the driving behavior in an ideal manner and correlates strongly with the fuel consumption. For this purpose, the position of the gas pedal over time is determined, for example, over the entire trip. An additional advantage of the inventive method consists in that the position of the gas pedal can be detected in a very simple manner. In another inventive manner, it has been recognized that the determination of the position of the gas pedal alone already provides sufficient information on the driving behavior to describe the driving behavior, so that a state of the driving behavior, for example, in the sense of conducive or nonconducive, can be indicated. According to the invention, the state of the driving behavior, based on the determined position of the gas pedal, is visually displayed to the vehicle driver by means of a display device in the motor vehicle. In a particularly advantageous manner, this occurs almost in real time, namely in such manner that the vehicle driver obtains direct feedback with regard to his/her driving mode or with regard to his/her driving behavior.

Consequently, with the inventive method and with the inventive device, ingeniously and using simple constructive means, a determination and optionally an influencing of the driving behavior during a trip, in particular with regard to the fuel consumption, is possible.

Here, it should be pointed out explicitly that the term "fuel" should be understood in the broadest sense, namely it should be understood to mean any energy carrier which can be provided for a vehicle. For example, here the energy carrier can be gasoline, diesel fuel, natural gas, electrical energy, hydrogen, etc.

Advantageously, depending on the determined position of the gas pedal, as state of the driving behavior, a positive state, a neutral state and a negative state can be visually displayed to the vehicle driver. By classification into—at least—three states, the driving behavior can be differentiated particularly advantageously. Here, a positive state corresponds to a desired and conducive driving behavior. The vehicle driver can be encouraged and influenced by the visual display of the positive state, to the effect that he/she maintains or repeats this driving mode. The negative state corresponds to an undesirable or nonconducive driving behavior. By the display of the negative state, the vehicle driver should be encouraged to avoid nonconducive driving behavior in the future. Since a determined state of the driving behavior is based on the determined position of the gas pedal, the vehicle driver gets direct and qualitative feedback by means of the display device on his/her user behavior in terms of gas pedal activation. Moreover, a neutral state with regard to his/her driving behavior can be signaled to the vehicle driver. This information means that the classification of the driving behavior is undetermined or undeterminable, which is not considered or cannot be considered to be positive or negative. Thus, the vehicle driver can be informed effectively and in a differentiated manner about his/her driving behavior. This informal feedback occurs during the trip with the motor vehicle, so that the vehicle driver can be influenced with regard to his/her driving behavior and react appropriately to the respective information.

In another advantageous manner, for the preferably continuous acquisition or determination of the state of the driving behavior, predefined journey sections during a trip of the vehicle driver can be taken into consideration. Here, a state transition from a current state into one subsequent state per journey section can be carried out. Here, it should be noted that the subsequent state can correspond to another state or again to the current or same state. Ideally, the predefined journey sections can be selected to be relatively short. For example, a predefined journey section can have a journey section duration of at most 5 minutes, preferably of at most 2 minutes. Moreover, the journey section duration here can be at least 20 seconds. Consequently, advantageous journey sections have a journey section duration of approximately 20 to 120 seconds. In this manner, advantageously, relatively short interval trips can be taken into consideration, which are optimally suited for drawing a conclusion on the quality of the driving behavior, based on the associated course of the gas pedal positions or based on the associated operating mode of the gas pedal.

In a particularly advantageous manner, a state transition from a current state into a subsequent state, which can correspond to another state or again to the current or same state, can occur as a function of a presettable minimum activation intensity of the gas pedal. Ideally, a state transition can occur as a function of a presettable minimum activation intensity of the gas pedal, for example, full throttle, for a presettable minimum activation duration. Thus, a minimum activation intensity of the gas pedal can be set, which causes a possibly excessively high fuel consumption. Such an activation of the gas pedal, for example, during a predefined journey section such as an interval trip, should therefore not occur too often or for an excessively long duration; instead, it should be used only moderately. In particular, in traffic companies, the routes of the motor vehicle are known, so that journey sections for a route can be established and analyzed, in order to be able to preset suitable values for a minimum activation intensity of the gas pedal and/or for a minimum activation duration. This enables, for example, during the trip, a classification of the journey sections to be traveled, based on whether the respective journey section has a short and thus acceptable full throttle duration, or a long and thus unacceptable full throttle duration. As a function of either an acceptable full throttle duration or an unacceptable full throttle duration within a journey section, a corresponding state transition for the journey section can be triggered and carried out.

Moreover, it is conceivable that the minimum activation duration is selected in such a manner that, as minimum activation duration, the duration is taken into consideration in which the motor vehicle has reached 50 percent of the maximum speed in the journey section. If, after this duration, the gas pedal is released again or in any case no longer depressed full throttle, then the full throttle duration is classified as short or acceptable, and a state transition in direction of the positive state occurs.

In an advantageous design, admissible state transitions can be implemented as follows:
 transition from neutral state to positive state;
 transition from positive state to positive state;
 transition from positive state to neutral state;
 transition from neutral state to negative state;
 transition from negative state to negative state.

Advantageously, the neutral state can be selected as initial state. Depending on the respective driving behavior determined, namely by determining the gas pedal position, a state transition from the neutral state into the positive state or a state transition from the neutral state into the negative state can occur.

For example, in the context of an advantageous design, in the case of a journey section with acceptable full throttle duration, a transition from the neutral state into the positive state occurs. In the case of a journey section with unacceptable full throttle duration, on the other hand, a transition from the neutral state into the negative state occurs. Advantageously, in the case of journey sections with acceptable full throttle duration, a transition in direction of the positive state occurs. In the case of journey sections with unacceptable full throttle duration, a transition in direction of the negative state occurs. Here, in the case of successive journey sections with acceptable full throttle duration, in each case a transition from the positive state back again into the same positive state can occur, i.e., the positive state is maintained. It is only in the case of a journey section with unacceptable full throttle duration that a transition from the positive state back into the neutral state occurs, and, optionally, in subsequent journey sections which also have an unacceptable full throttle duration, a transition to the negative state occurs.

With regard to a motivating influencing of the vehicle driver, the transition from neutral state to neutral state can be provided as an additional state transition and thus be considered admissible, wherein this state transition is carried out for a presettable number of successive journey sections, in which a presettable minimum activation intensity of the gas pedal, in particular full throttle, occurs for a presettable minimum activation duration, before a state transition from neutral state to negative state occurs. Thus, it is possible to praise the vehicle driver promptly for conducive driving behavior, namely by displaying the positive state, and, in the case of nonconducive behavior, to alert the vehicle driver only after certain delay or only if the nonconductive behavior is repeated, possibly repeated multiple times, namely by means of a visual display of the negative state. Consequently, it is possible to prevent annoying a vehicle driver by displaying the negative state too quickly. For example, it is conceivable that, due to a given unforeseeable traffic situation, the vehicle driver is forced to an unacceptable full throttle duration within a journey section, in which case he/she is not responsible for this full throttle activation of the gas pedal. In principle, full throttle durations classified as unacceptable or long full throttle durations can occur in the case of regular or normal driving behavior. A resulting negative state evaluation may annoy the vehicle driver.

Advantageously, a change of the state between the positive state and the negative state can be carried out in such a manner that the change requires a state transition between the neutral state and the positive state as well as a state transition between the neutral state and the negative state.

With a view to a robust and correct state representation, the display device can be deactivated and/or visually display the neutral state, if the motor vehicle is travelling or in movement without interruption for a presettable duration. Thus, the indication of the state can be carried out only in the case of suitable journey sections of a trip, namely preferably typical short interval trips in city traffic. Trips on highways or overland trips can be left out of consideration, since, in this case, it is usually less easy to make an appropriate statement regarding the current driving behavior based on the gas pedal position.

Moreover, with a view to a robust and correct state representation, it is conceivable that the display device is deactivated and/or visually displays the neutral state, if the motor vehicle exceeds a presettable speed. Thus, based on atypical speeds, unsuitable journey sections such as, for example, outside of the urban area, can be left out of consideration.

Moreover, it should be pointed out that the above discussed features concerning the inventive method and/or the advantageous designs can also represent a device design. Combining these features with the features concerning the device claims is not only possible, but advantageous.

Different possibilities now exist to configure and develop the teaching of the present invention in an advantageous manner. For this purpose, on the one hand, reference should be made to the claims that are subordinate to Claim 1 and, on the other hand, to the following explanation of preferred embodiment examples of the invention based on the drawing. In connection with the explanation of the preferred embodiment examples of the invention based on the drawing, generally preferred designs and developments of the teaching are also explained. In the drawing.

Figure 1:
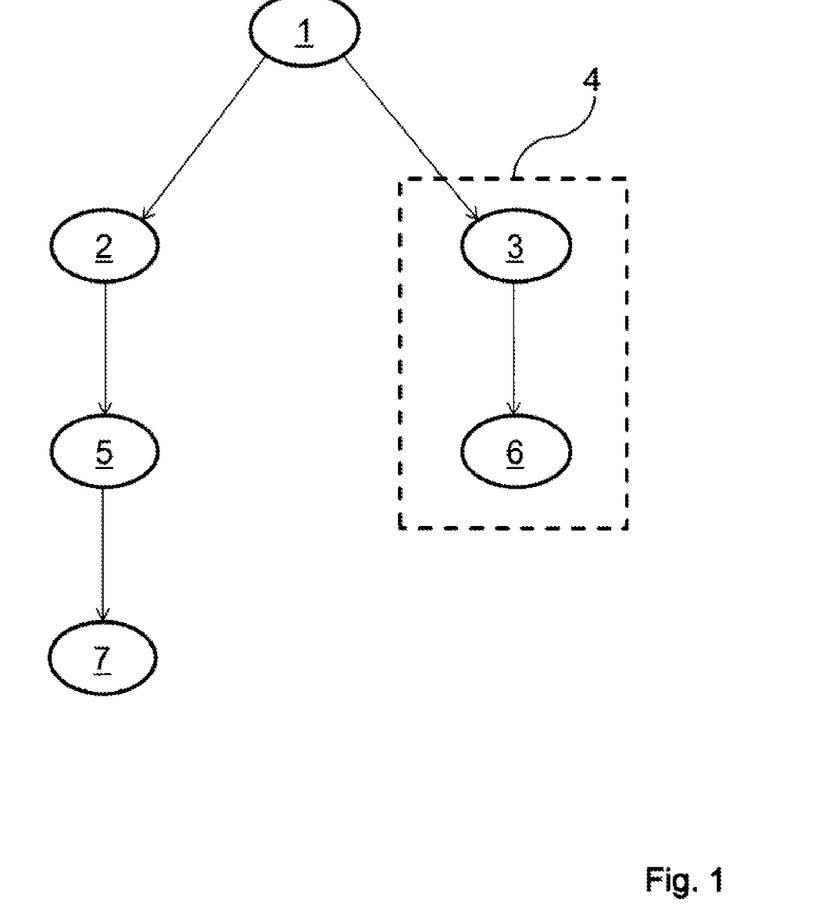
FIG. 1 shows, in schematic view, a flow chart of an embodiment example of the inventive method.

FIG. 1 shows, in a schematic view, a flow chart of an embodiment example of the inventive method. Here, first, by means of a detection device 1 with a suitable sensor system, the position of the gas pedal over time is detected continuously. Moreover, by means of the detection device 1 or an additional sensor system, in addition to the position of the gas pedal, other parameters can also be detected, based on which the driving behavior of the vehicle driver can be determined. The data detected by the detection device 1 is stored in a storage unit 2 of the vehicle and/or transmitted to a storage unit 3 of a central computer 4. In a preferred manner, the transmission can occur wirelessly—via a mobile radio network or via W-LAN—and in real time. The data stored in the control unit 2 can be further processed by a computing unit 5 arranged, for example, in the vehicle.

In the same manner, the data stored in the storage unit 3, for example, a database, can be further processed by a computing unit 6 of the central computer 4. The further processing here occurs in such a manner that the driving behavior of the vehicle driver can be determined and/or analyzed based on the data. In this manner, for example, a public traffic company can collect data, in particular data relating to the gas pedal position during predefined journey sections such as, preferably, short interval trips. By carrying out this data collection for several vehicle drivers of a vehicle fleet, it is possible to derive and compute therefrom, for example, suitable values for a minimum activation intensity of the gas pedal, for a minimum activation duration and/or for a number of successive journey sections, in which a state transition from neutral to neutral should occur.

Based on the determined position of the gas pedal, the internal computing unit 5 can determine the state of the driving behavior. The state is then visually displayed to the vehicle driver by means of a display device 7 arranged in the motor vehicle. Thus, the vehicle driver can be provided with information on whether his/her driving behavior corresponds to a desired driving behavior, for example, with regard to the fuel consumption.

Figure 2:
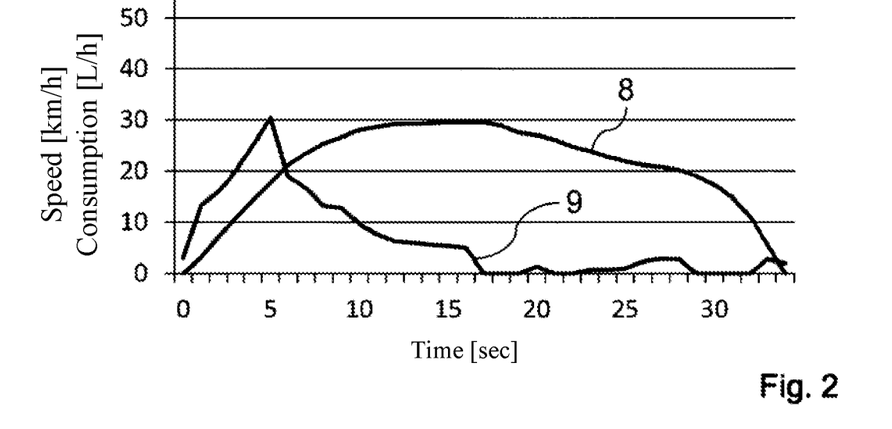
FIG. 2 shows the speed determined over time as well as the fuel consumption determined over time of a first vehicle driver.

FIG. 2 shows the speed determined over time as well as the fuel consumption determined over time of a first vehicle driver. For this purpose, in a first curve 8, the speed in km/h is plotted against time t in seconds, and in a second curve 9 the fuel consumption in L/h is plotted against time t in seconds.

It is clear from FIG. 2, that this is the typical curve of an interval trip as journey section, as it occurs between two stops of a bus line. Said interval trip is characterized by a relatively short total driving time of only approximately 35 seconds, in which the vehicle first accelerates strongly to approximately 30 km/h, wherein this speed is maintained for only approximately 8 seconds, and then the vehicle already reduces its speed again and finally comes to a stop at the next stop. In the graph shown in FIG. 2, the fuel consumption for this trip is approximately 0.064 liters.

Figure 3:
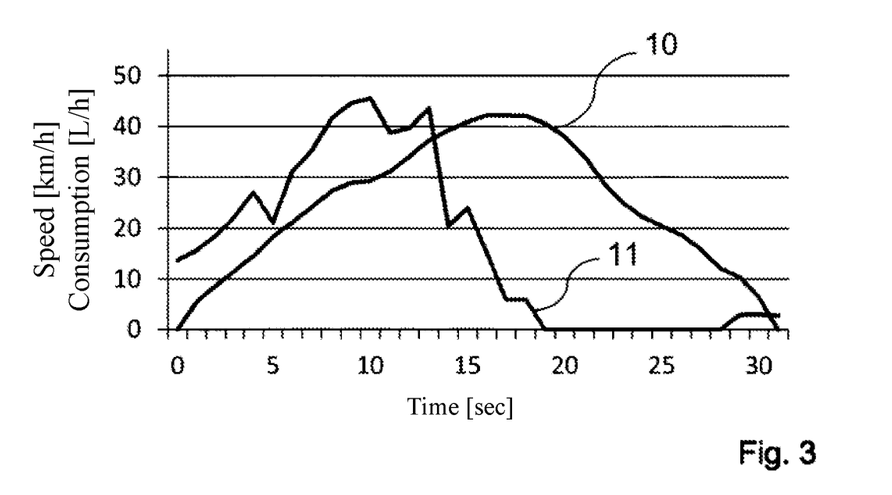
FIG. 3 shows the speed determined over time as well as the fuel consumption determined over time of a second vehicle driver.

FIG. 3 shows the speed determined over time as well as the fuel consumption determined over time of a second vehicle driver, wherein the driving distance is identical to the driving distance on which FIG. 2 is based. For this purpose, in a third curve 10, the speed in km/h is plotted against time t in seconds and, in a fourth curve 11, the fuel consumption in L/h is plotted against time t in seconds.

The driving time which the second vehicle driver needs is only insignificantly shorter than the driving time represented in FIG. 2, namely 32 seconds. It is essential here that the first curve 8 and the third curve 10 differ only slightly from one another, in particular, that they substantially correspond to one another in the range between 0 seconds and 8 seconds.

However, the fuel consumption in FIG. 3, compared to FIG. 2, is approximately twice as high, namely approximately 0.144 liters for this trip. From the comparison of FIGS. 2 and 3, it is clear that, in the case of interval trips, the determined speed over time is not suitable as parameter for the determination of the driving behavior.

Figure 4:
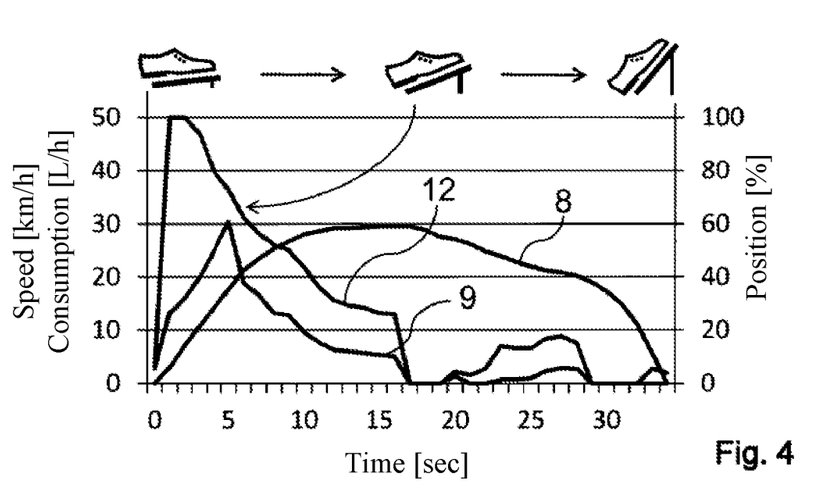
FIG. 4 shows the graph according to FIG. 2, wherein the position of the gas pedal determined over time has been plotted additionally.

FIG. 4 shows the graph according to FIG. 2, wherein, in addition, the determined position of the gas pedal over time is plotted as fifth curve 12. The position of the gas pedal is indicated as a percentage, wherein 100% corresponds to the position of a completely activated gas pedal, preferably in the sense of full throttle, and 0% corresponds to the position of a completely unactivated gas pedal.

Figure 5:
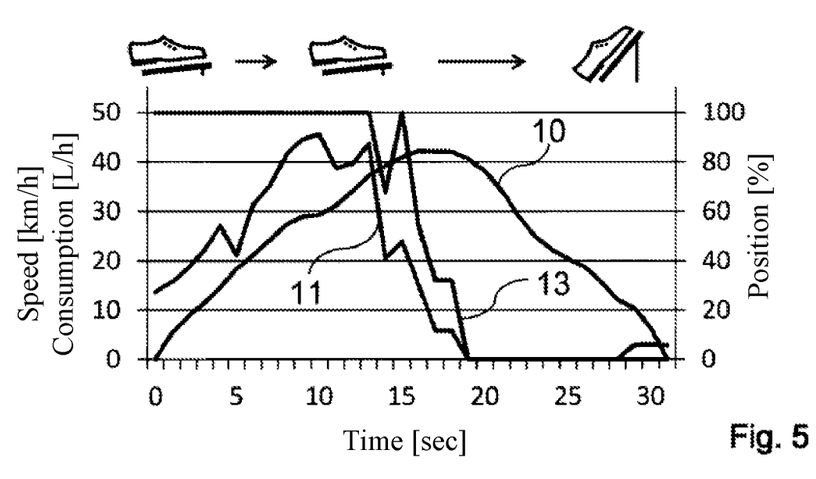
FIG. 5 shows the graph according to FIG. 3, wherein the position of the gas pedal determined over time has been plotted additionally.

FIG. 5 shows the illustration according to FIG. 3, wherein, here too, the position of the gas pedal determined over time is plotted additionally, as sixth curve 13.

The comparison of the fifth curve 12 from FIG. 4 and the sixth curve 13 from FIG. 5 shows that these curves differ significantly from one another over the entire time course, in particular also in the range between 0 seconds and 8 seconds. As a result, it becomes clear that the position of the gas pedal over time is ideally suited as parameter for the determination and evaluation of the driving behavior.

Figure 6:
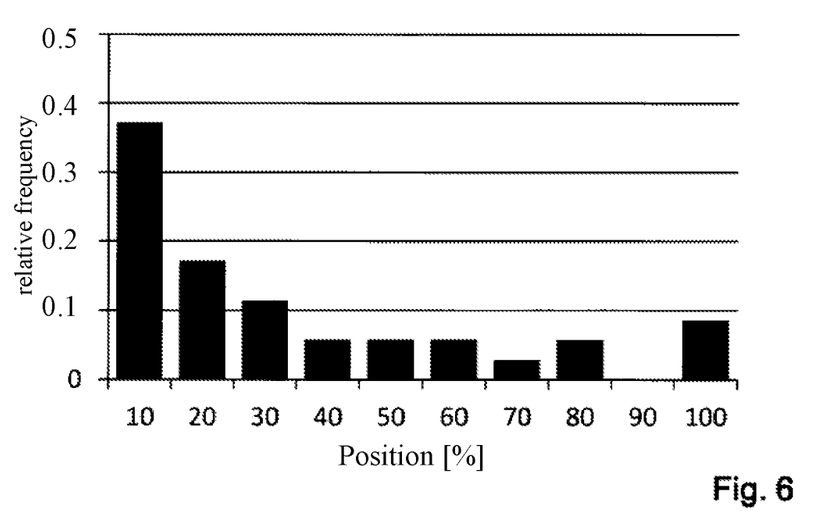
FIG. 6 shows the distribution of the relative frequency of the differently intense activations of the gas pedal of the curve represented in FIG. 4.
Figure 7:
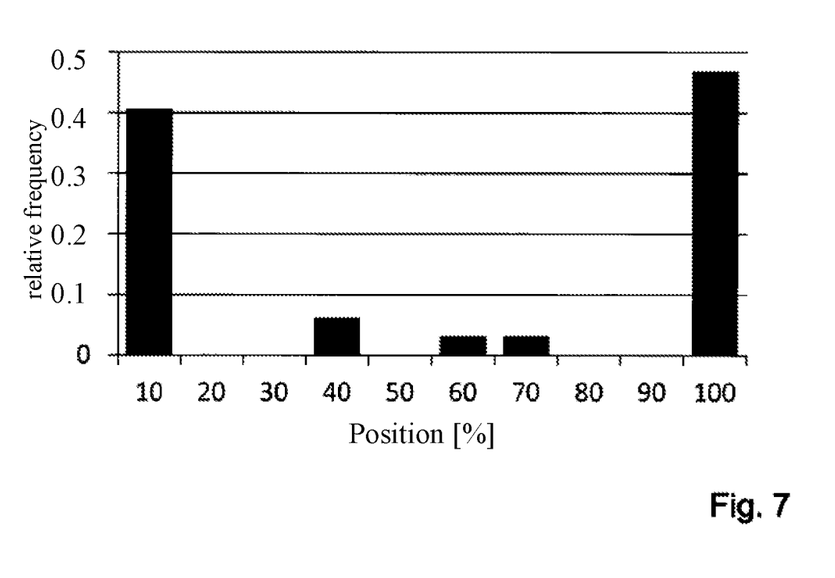
FIG. 7 shows the distribution of the relative frequency of the differently intense activations of the gas pedal of the curve represented in FIG. 5.

FIG. 6 shows the distribution of the relative frequency of the differently intense activations of the gas pedal of the fifth curve 12 represented in FIG. 4. FIG. 7 shows the distribution of the relative frequency of the differently intense activations of the gas pedal of the sixth curve 13 represented in FIG. 5.

The comparison of FIGS. 6 and 7 again makes it clear that the first vehicle driver and the second vehicle driver activate the gas pedal quite differently, wherein, namely, the second vehicle driver according to FIG. 7 completely activates the gas pedal, i.e., completely "floors" the gas pedal, clearly more frequently. Based on FIGS. 6 and 7, the different driving behavior of the first vehicle driver and of the second vehicle driver can be seen very clearly. As a result, it is shown that the position of the gas pedal over time is ideally suited as parameter for the determination of the driving behavior. Furthermore, the position of the gas pedal can be detected by an extremely simple sensor system.

Figure 8:
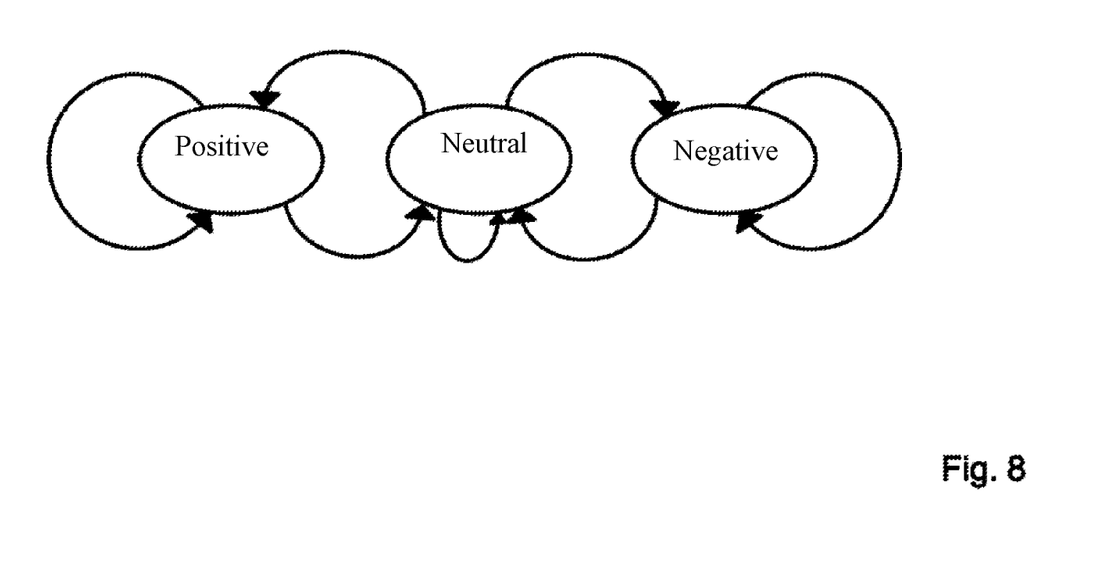
FIG. 8 shows, in a schematic view, possible states and state transitions according to an embodiment example of the inventive method.

FIG. 8 shows, in a schematic view, possible states and state transitions according an embodiment example of the inventive method. In concrete terms, FIG. 8 represents a finite automaton. As initial state, the neutral state is provided. State transitions or transitions to the positive state or to the negative state occur as a function of the driving behavior based on the determined gas pedal position. The negative state and the positive state are not directly linked to one another. They can be reached only via the neutral state. The triggering of state transitions or transitions depends on the activation behavior of the gas pedal during a journey section.

Figure 9A:
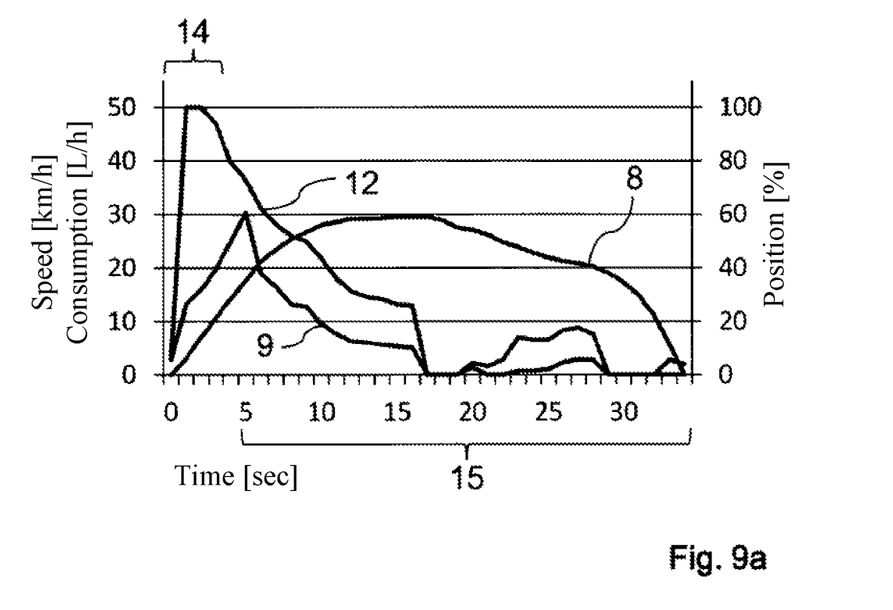
FIG. 9*a*, 9*b* show, in a schematic view, an illustration of possible state transitions in relation to the journey section according to FIG. 4, FIG. 10*a*, 10*b* show, in a schematic view, an illustration of possible state transitions in relation to a journey section according to FIG. 5.
Figure 9B:
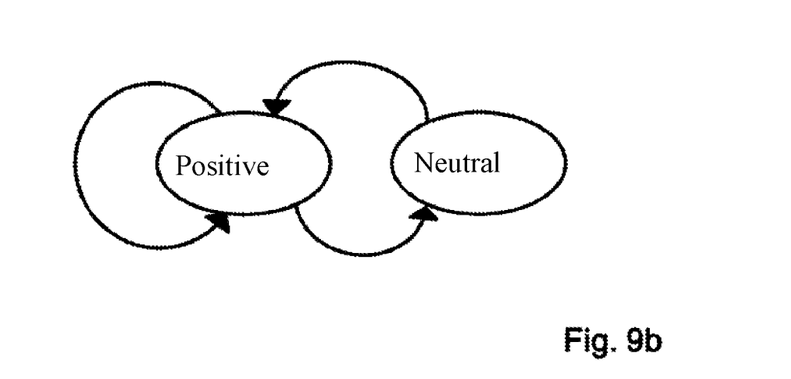

FIG. 9*a*, 9*b* show, in a schematic view, an illustration of possible state transitions in relation to the driving section according to FIG. 4. The graph according to FIG. 9*a* corresponds to the graph according to FIG. 4, wherein, for the fifth curve 12, which represents the position of the gas pedal determined over time, the full throttle duration 14 and the duration 15 of the pedal release process are marked. The represented journey section has a short and acceptable full throttle duration 14.

Figure 10A:
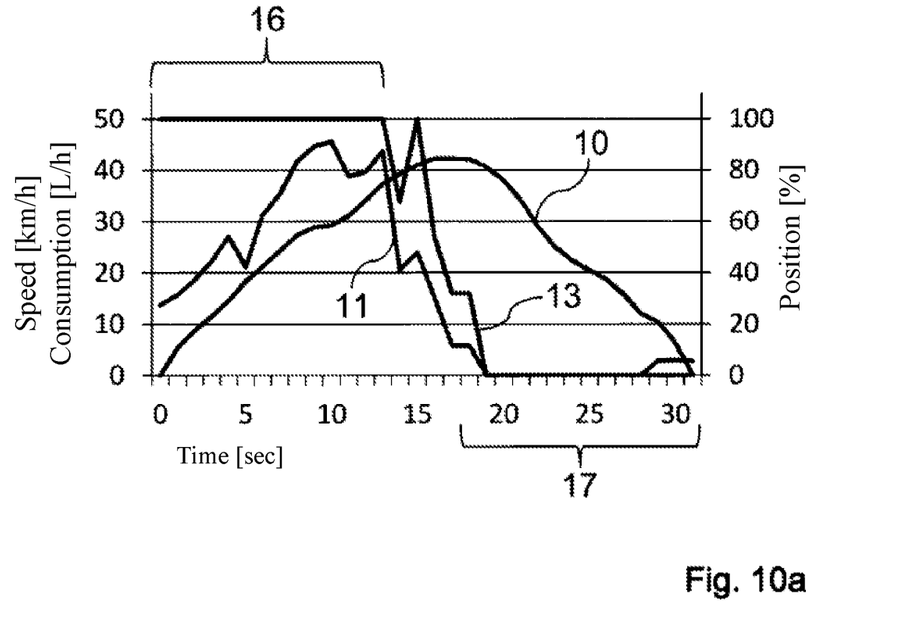
Figure 10B:
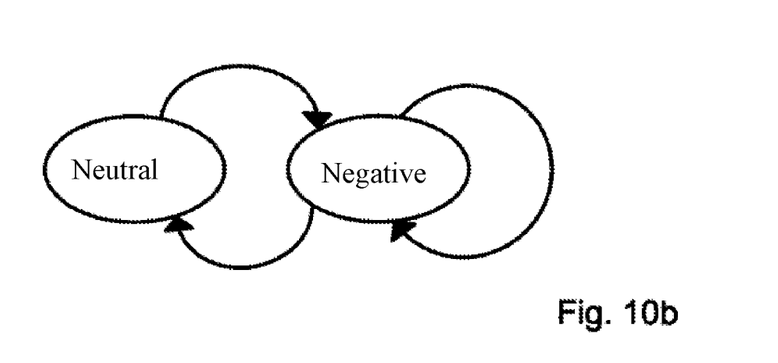

The state transitions or transitions then occur according to FIG. 9*b* as follows:

If full throttle duration within a journey section acceptable:
   transition from neutral state to positive state
If full throttle duration within the subsequent journey section acceptable, then:
   transition from positive state to positive state
Otherwise:
   transition from positive state to neutral state FIG. 10*a*, 10*b* show, in a schematic view, an illustration of possible state transitions in relation to the journey section according to FIG. 5. The graph in FIG. 10*a* corresponds to the graph according to FIG. 5, wherein, for the sixth curve 13, which represents the position of the gas pedal determined over time, the full throttle duration 16 and the duration 17 of the pedal release process are marked. The represented journey section has a long and unacceptable full throttle duration 14.

Figure 11:
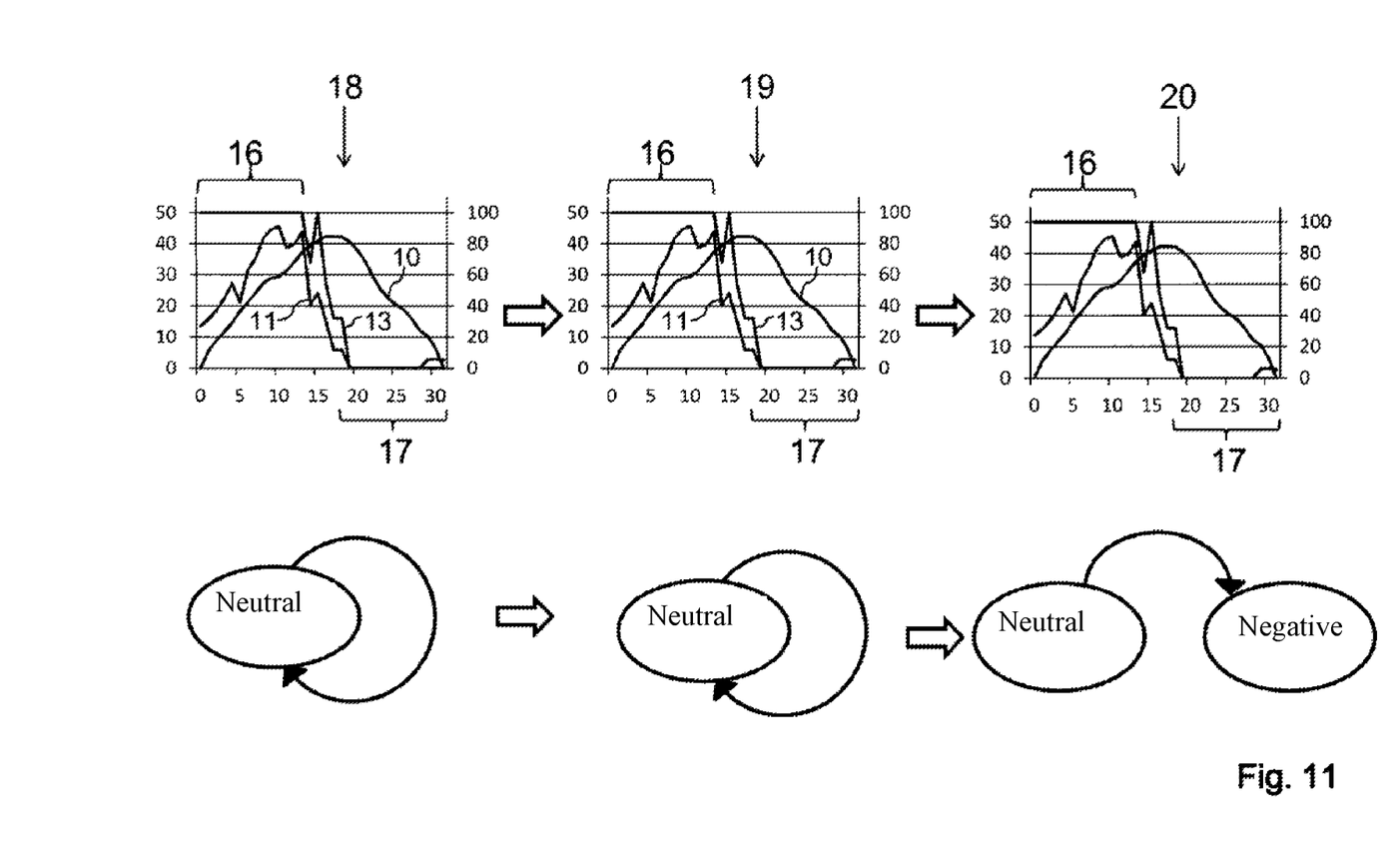
FIG. 11 shows, in a schematic view, an additional illustration of possible state transitions in relation to a journey section according to FIG. 5.

If full throttle duration within a journey section unacceptable:
   transition from neutral state to negative state
If full throttle duration within the subsequent journey section unacceptable, then:
   transition from negative state to negative state
Otherwise:
   transition from negative state to neutral state FIG. 11 shows, in a schematic view, an additional illustration of possible state transitions according to an additional embodiment example of the invention in relation to a journey section according to FIG. 5. According to the embodiment example from FIG. 11, in the case of a long and unacceptable full throttle duration 16 within a journey section, first a state transition or a transition from the neutral state into the neutral state occurs. According to FIG. 11, this applies to the journey section 18 and to the subsequent journey section 19. It is only in the subsequent next or third journey section 20, which also has a long and unacceptable full throttle duration 16, that a state transition or transition from the neutral state into the negative state occurs. Thus, it is ensured that the vehicle driver does not become annoyed too quickly as a result of the display of the negative state. This is the case, for example, if, due to a given unforeseeable traffic situation, the vehicle driver is forced to an unacceptable full throttle duration within a journey section, for which, however, he/she is not responsible.

Figure 12:
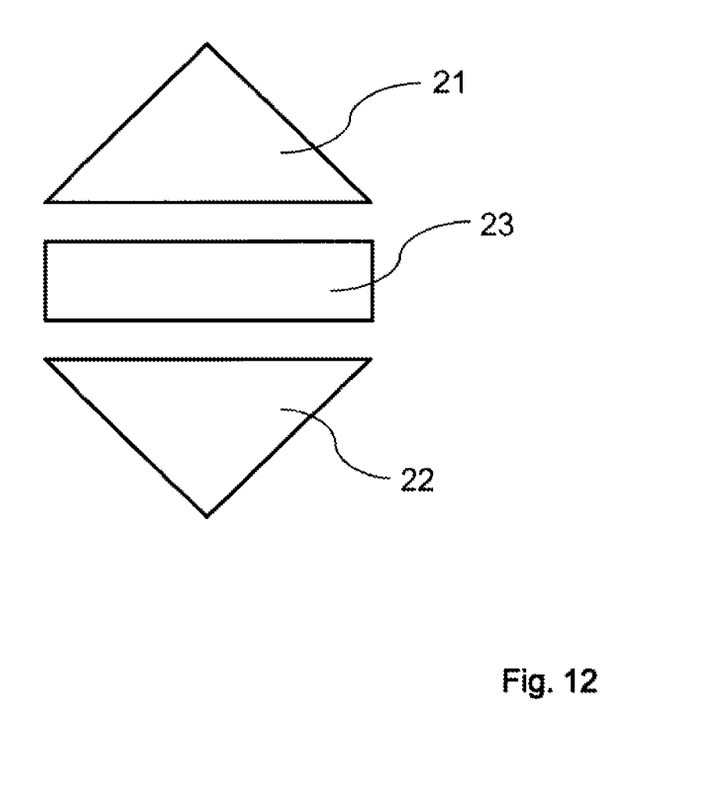
FIG. 12 shows a display device for an embodiment example according to the inventive method or for an embodiment example according to the inventive device.

FIG. 12 shows a display device for an inventive embodiment example or for an embodiment example according to the inventive device. The display device is configured in such a manner that a positive state, a neutral state and a negative state with regard to the driving behavior of the vehicle driver can be visually displayed. For this purpose, the display device according to FIG. 12 comprises a green light field 21 for visually displaying the positive state, a red light field 22 for visually displaying the negative state, and a light field 23 illuminated in any other desired color for signaling the neutral state.

With regard to additional advantageous designs of the inventive method and of the inventive device, in order to avoid repetitions, reference is made to the general part of the description as well as to the appended claims.

Finally, it is explicitly pointed out that the above described embodiment examples of the inventive method or of the inventive device are intended only to discuss the claimed teaching which, however, they do not limit to the embodiment examples.

LIST OF REFERENCE NUMERALS

1 Detection device
2 Storage unit (internal)
3 Storage unit (external)
4 Central computer
5 Computing unit
6 Computing unit (external)
7 Display device
8 First curve
9 Second curve
10 Third curve
11 Fourth curve
12 Fifth curve
13 Sixth curve
14 Full throttle duration
15 Duration of pedal release process
16 Full throttle duration
17 Duration of pedal release process
18 Journey section
19 Journey section
20 Journey section
21 Light field
22 Light field
23 Light field

The invention claimed is:

1. A computer implemented method of evaluating and/or influencing a driving behavior of a driver of a motor vehicle while the driver is driving the motor vehicle, the method comprising:
   measuring, by a sensor, at least one parameter that describes the driving behavior,
   wherein the at least one parameter includes positions of the motor vehicle's gas pedal over time;
   determining, by a computing device, a state of the driving behavior based on the measured positions of the gas pedal, wherein determining the state of the driving behavior is based on information regarding predetermined journey sections such that a quality of the driving behavior is determined based on a use of the gas pedal occurring during the predetermined journey sections, wherein the predetermined journey sections have a journey section time period of at least 20 seconds and at most 2 minutes, and wherein determining the state of the driving behavior includes triggering a state transition for the predetermined journey sections as a function of a predetermined full throttle duration of the gas pedal within the predetermined journey sections;
   providing information regarding the quality of the driver's driving behavior while the driver is driving such that the state of the driving behavior is visually displayed to the vehicle driver on a display device in the vehicle.

2. The method according to claim 1, wherein visually displaying a state of the driving behavior further comprises displaying one or more of a positive state, a neutral state, and a negative state.

3. The method according to claim 1, wherein determining the state of the driving behavior includes determining an occurrence of a state transition, as a function of a presettable minimum activation intensity of the gas pedal.

4. The method according to claim 1, further comprising determining one or more of the following state functions:
   a transition from a neutral state to a positive state;
   a transition from a positive state to a positive state;
   a transition from a positive state to a neutral state;
   a transition from a neutral state to a negative state; and
   a transition from a negative state to a negative state.

5. The method according to claim 4, wherein as an additional state transition, a transition from neutral state to neutral state is admissible, wherein this state transition is carried out for a presettable number of successive journey sections, in which a presettable minimum activation intensity of the gas pedal occurs for a presettable minimum activation duration, before a state transition from neutral state to negative state occurs.

6. The method according to claim 4, wherein a change of the state between the positive state and the negative state is carried out in such a manner that the change requires a state transition between the neutral state and the positive state as well as a state transition between the neutral state and the negative state.

7. The method according to claim 1, wherein the display device is deactivated or visually displays the neutral state, when the motor vehicle travels or is in movement without interruption for a presettable duration.

8. The method according to claim 1, wherein the display device is deactivated or visually displays the neutral state, when the motor vehicle exceeds a presettable speed.

9. The method according to claim 1, further comprising evaluating and/or influencing the driving behavior of the motor vehicle while the driver is driving in local public transport or inner city traffic.

10. The method according to claim 1, further comprising performing the method during use in vehicle fleets.

11. The method according to claim 1, wherein determining the state of the driving behavior is performed continuously.

12. The method according to claim 1, wherein one state transition per journey section is determined.

13. The method according to claim 1, further comprising determining a state transition that occurs as a function of a presettable minimum activation intensity of the gas pedal, namely full throttle, for a presettable minimum activation duration.

14. The method according to claim 4, wherein as an additional state transition, a transition from neutral state to neutral state is admissible, wherein this state transition is carried out for a presettable number of successive journey sections, in which a presettable minimum activation intensity of the gas pedal, namely full throttle, occurs for a presettable minimum activation duration, before a state transition from neutral state to negative state occurs.

15. A device configured to evaluate and/or influence a driving behavior of a driver of a motor vehicle while the driver is driving the motor vehicle,
   comprising a sensor configured to measure at least one parameter describing the driving behavior, a computing device, and a display device,
   wherein the sensor is configured to measure the at least one parameter that includes positions of the motor vehicle's gas pedal over time,
   wherein the computing device is configured to determine the state of the driving behavior, based on the determined position of the gas pedal, wherein determining the state of the driving behavior is based on information regarding predetermined journey sections such that a quality of the driving behavior is determined based on a use of the gas pedal occurring during predetermined journey sections, wherein the predetermined journey sections have a journey section time period of at least 20 seconds and at most 2 minutes, wherein determining the state of the driving behavior includes triggering a state transition for the predetermined journey sections as a function of a predetermined full throttle duration of the gas pedal within the predetermined journey sections, wherein information regarding the quality of the driver's driving behavior is provided while the driver is driving, and wherein the display device is configured to display the state of the driving behavior.

16. The system according to claim 15, wherein the computing device is further configured to determine that a state transition occurs as a function of a presettable minimum activation intensity of the gas pedal for a presettable minimum activation duration.

17. The device according to claim 15, wherein the computing device is configured to perform evaluating and/or influencing of the driving behavior of the motor vehicle in local public transport or inner city traffic.

18. The device according to claim 15, wherein the device is configured for use in vehicle fleets.

* * * * *